United States Patent [19]

Ikeda et al.

[11] 4,196,335

[45] Apr. 1, 1980

[54] SUBMERGED ARC WELDING PROCESS

[75] Inventors: Masahiko Ikeda; Mutsuo Nakanishi; Norio Katsumoto, all of Amagasaki, Japan

[73] Assignee: Sumitomo Metal Industries, Ltd., Osaka, Japan

[21] Appl. No.: 907,495

[22] Filed: May 19, 1978

Related U.S. Application Data

[63] Continuation-in-part of Ser. No. 781,308, Mar. 25, 1977, abandoned.

[30] Foreign Application Priority Data

Mar. 26, 1976 [JP] Japan .................................. 51/33961

[51] Int. Cl.² .............................................. B23K 9/18
[52] U.S. Cl. .................................. 219/73; 219/76.12; 219/76.14; 219/137 R; 219/137 WM
[58] Field of Search .............. 219/73 R, 76.12, 137 R, 219/137 WM, 76.14

[56] References Cited

U.S. PATENT DOCUMENTS

| | | | |
|---|---|---|---|
| 3,919,517 | 11/1975 | Ishizaki | 219/73 R |
| 3,922,634 | 12/1975 | Mulder | 219/76 |
| 3,944,776 | 3/1976 | Tsuboi | 219/73 R |
| 4,003,766 | 1/1977 | Ito | 148/24 |

*Primary Examiner*—Richard R. Kucia
*Attorney, Agent, or Firm*—Fleit & Jacobson

[57] ABSTRACT

Submerged arc welding process for 3.5% Ni steel which can provide a welded portion having a satisfactory impact resistance at low temperatures such as below minus 100° C. In the process, use is made of a flux having a basicity as defined by a formula ($CaO + MgO/SiO_2$) in weight percentages of between 1.5 and 3. The weld metal is deposited in a plurality of superimposed welded layers, each having a thickness less than 7 mm so that the weld metal in an underlying layer is thermally affected by an adjacent overlying layer whereby recrystallization is effected in substantial thickness of the underlying layer to provide a fine crystalline structure.

6 Claims, 6 Drawing Figures

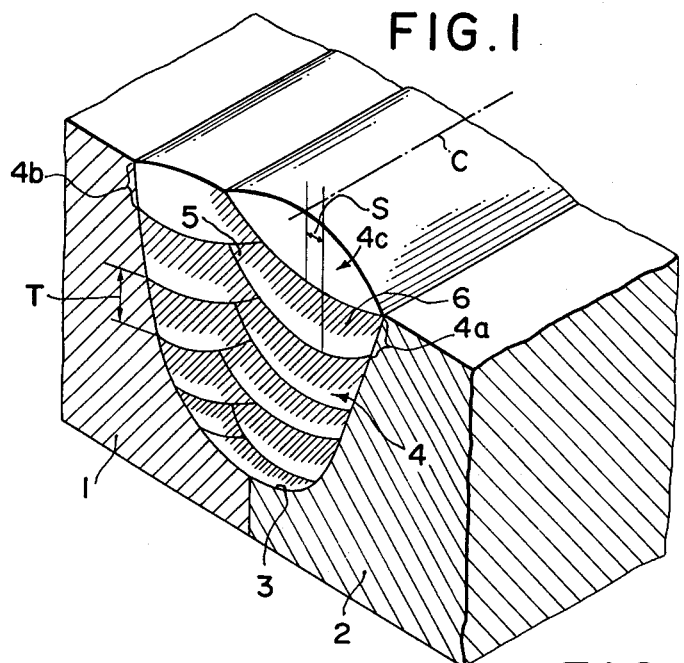
FIG.1
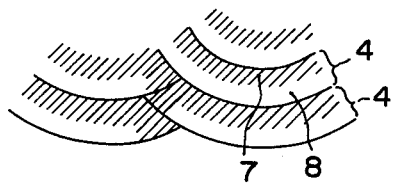
FIG.2
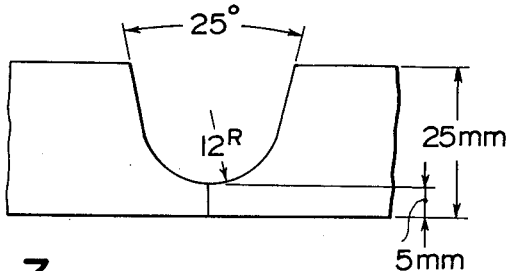
FIG.4
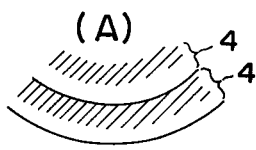
FIG.3
(A)
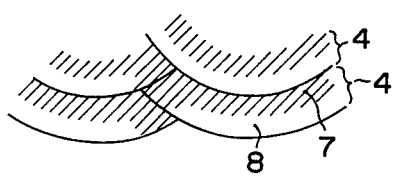
(B)
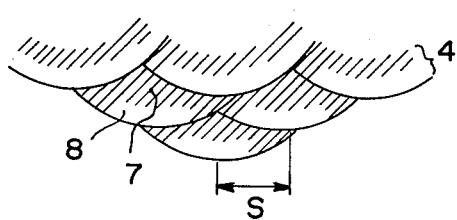
(C)

SUBMERGED ARC WELDING PROCESS

CROSS-REFERENCE TO RELATED APPLICATION

This application is a continuation-in-part of our copending application Ser. No. 781,308, filed Mar. 25, 1977, entitled "Submerged Arc Welding Process" now abandoned.

The present invention relates to a submerged arc welding process and more particularly to a submerged arc welding process suitable for structural members which are subjected in use to low temperatures. More specifically, the present invention relates to a sub-merged welding process in which weld metal is deposited in a plurality of superimposed layers.

Conventionally, vessels for storing liquefied gas such as liquid nitrogen, liquid oxygen or the like are constructed from steel material by means of hand-welding. Since these vessels are subjected in use to extreme low temperatures such as below minus 100° C., it is very important to provide them with adequate impact-resistant property at such low temperatures.

From the viewpoint of manufacture, it is desirable to automatically perform the welding operation using, for example, a submerged arc welding process. However, conventional submerged arc welding processes have not been satisfactory for structures which are subjected in use to low temperatures, particularly in respect of the toughness of the weld metal. Such conventional submerged arc welding processes are conducted with a relatively low thermal input which is expected to be effective in producing fine crystalline structure having a satisfactory impact resistance. However, it has not been possible to provide an adequate impact resistance at low temperatures only through a relatively low thermal input.

The present invention has therefore an object to provide a submerged arc welding process which can produce a weld metal having a high impact resistance property at extremely low temperatures.

Another object of the present invention is to provide a submerged arc welding process which is particularly suitable for use in constructing vessels serviced at extremely low temperatures.

A further object of the present invention is to provide a submerged arc welding process in which weld metal is deposited in plurality of superimposed layers so that the metal in one deposited layer receives thermal effect from the overlaid layer to produce recrystallized fine sructures.

According to the present invention, the above and other objects can be accomplished by a submerged arc welding process in which use is made of flux having a basicity as defined by a formula $CaO+MgO/SiO_2$ in weight percentage of between 1.5 and 3 and which comprises the step of producing a plurality of deposited layers of weld metal under a welding current of 400 to 700 A and an arc voltage of 35 to 48 V, each of said layers having a thickness not greater than 7 mm so that the weld metal in an underlying layer is thermally affected by an adjacent overlying layer whereby recrystallization is effected in substantial thickness of the underlying layer.

According to the present invention, it is preferred to use a bond type flux including on the basis of weight 10 to 30 percent of $SiO_2$, 8 to 20 percent of $Al_2O_3$, 25 to 45 percent of MgO, 10 to 30 percent of CaO, 7 to 20 percent of $CaF_2$ and at least one selected from metallic Si, Fe—Si and Fe—Si—Mn in an amount of 0 to 0.6 percent calculated in term of metallic Si. Where the welding process is applied to a steel material containing a relatively high percentages, for example 3.5%, of nickel, it is also preferred to use a welding electrode containing on the basis of weight 5 to 25 percent of $CaF_2$, 2.5 to 5.5 percent of Ni, 0 to 0.5 percent of Mo, 0 to 0.5 percent of Ti and the balance substantially of Fe.

Where the weld metal layers are deposited in staggered relationship, the transverse distance between the highest portion of an underlying layer and that of an adjacent overlying layer should not be greater than 5 mm. Further, it is also recommendable to maintain the thermal input below 40,000 J/cm.

The present invention is based on the findings that, in a welding structure having a plurality of superimposed layers of weld metal, an underlying layer receives a thermal influence from an adjacent overlying layer when the latter is being deposited so that the former is caused to produce a recrystallized fine structure and that the fine structure can effectively be utilized in obtaining an improved impact resistance at low temperatures such as below minus 100° C. Thus, the present invention is characterized by the fact that the weld metal is deposited in relatively thin superimposed layers whereby only a relatively thin portion in each layer remains thermally unaffected. According to the present invention, such thermally unaffected portion in each layer is less than 2 mm so that a substantial part of the layer is accounted for by the recrystallized metal of high impact resistance.

In order to obtain a high impact resistance and an improved toughness, it is required to maintain the oxygen content in the weld metal below 300 ppm., and this is accomplished through a use of flux having the basicity greater than 1.5. Further, a higher basicity is effective to decrease the Si content in the weld metal. However, since an increase in the basicity has an adverse effect on the weldability, the value should not exceed 3.0.

With respect to the flux, the aforementioned composition is recommendable for welding steel material containing high percentages of nickel for the following reasons.

The $SiO_2$ has an influence on the melting point of the flux and where the $SiO_2$ content is less than 10 percent there will be an increase in the melting point of the flux so that adverse effects will be seen in the performance of the welding operation and also in the appearance of the welded beads. With the $SiO_2$ content exceeding 30 percent, the $SiO_2$ will be chemically reduced and there will be an increase in the Si content in the weld metal resulting in a poor toughness of the weld metal.

The $Al_2O_3$ has an influence on the appearance of the welded beads and an acceptable range is between 8 and 20 percent. With the MgO content less than 25 percent, it will be difficult to maintain the basicity at a desirable level but where the content is greater than 45 percent the melting point of the flux will be increased to an unacceptable level. The CaO content should be greater than 10 percent in order to maintain the basicity within the desired range but it will have an adverse effect on the workability if it is increased beyond 30 percent.

The $CaF_2$ content should be greater than 7 percent in order to provide a satisfactory appearance on the welded beads. However, excessive addition of $CaF_2$ causes an unstable welding arc so that the content should be lower than 20 percent. In order to maintain the silicon content in the weld metal below 0.20 percent, it is required to maintain the silicon content of metallic Si, Fe—Si and Fe—Si—Mn in the flux to lower than 0.6 percent. Otherwise, there will be an adverse effect on the toughness at low temperatures due to an increase in the silicon content in the weld metal. As mentioned above, silicon containing deoxydizing agent may be metallic Si, Fe—Si, Fe—Mn—Si. It is of course possible to use a material other than silicon as the deoxydizing agent. For example, manganese may be used for the purpose. Thus, the flux of the present invention may contain deoxydizing agent in an amount of less than 0.6% calculated in term of silicon.

Regarding the cored wire, it has been found than the $CaF_2$ content should be greater than 5 percent to the total weight of the wire. Otherwise, blow-holes are apt to be produced in the weld metal and there will be a decrease in the toughness. With the $CaF_2$ content greater than 5 percent, there is an remarkable decrease in the oxygen content in the molten metal so that blow holes are prevented and the toughness is improved. However, the $CaF_2$ content should be exceed 25 percent because an excessive $CaF_2$ content makes the welding arc unstable and cause a poor workability.

In order to ensure an adequate impact-resistant property at minus 100° C., it is necessary to maintain the nickel content in the core wire in an amount of higher than 2.5 percent, however, where the content increases beyond 5.5 percent, it may cause cracks under high temperature.

Molybdenum may be incorporated to the cored wire for obtaining an increased strength of the weld metal but the content should not exceed 0.5 percent because it may have an adverse effect on the impact-resistant property at low temperatures where the Mo content is above this value.

Titanium may be also incorporated to the cored wire because it is effective in producing fine crystalline structures which serve to provide an improved impact-resistant property at low temperature. However, the titanium may be omitted because even when no titanium is contained it is possible to obtain a satisfactory impact-resistant property around minus 100° C. Where the Ti content is greater than 0.5 percent, there will be a decrease in the toughness due to an increase in the silicon content in the weld metal.

Nickel, molybdenum and titanium in the core material may be incorporated in the welding electrode in the form of ferrous alloy thereof, for example Fe—Ni, Fe—Mo and Fe—Ti. Fe—Ni, Fe—Mo or Fe—Ti may be incorporated to the electrode in the above mentioned amount calculated in term of nickel, molybdenum or titanium. It is of course that nickel, molybdenum or titanium may be added to the electrode in the form of elementary metal.

According to the present invention, the process is performed with a welding current of 400 to 700 A, an arc voltage of 35 to 48 V and a thermal input than 40,000 J/cm. With the welding current less than 400 A, it becomes difficult to maintain a stable welding arc, while the welding current exceeding 700 A produces deposited layers having a thickness greater than the desirable value. With the arc voltage less than 35 V, there will be an increase in the melting rate of the weld metal while the voltage greater than 48 V causes instable welding arc. The limit of the thermal input is necessary in order to maintain the fine crystalline structures and the thin deposited layers of the welding metal.

The inventors also had found that under the aforementioned welding condition of the present invention, welding should be preferably conducted at a velocity of 20 to 50 cm/minute to provide deposit layer of a thickness less than 7 mm.

The features of the present invention will become more apparent from the following descriptions which proceed taking reference to the accompanying drawings, in which:

FIG. 1 is a fragmentary perspective view showing steel plates which are being welded in accordance with the present invention;

FIG. 2 is an enlarged fragmentary sectional view showing an example of deposited layers of weld metal;

FIGS. 3 A, B and C show examples of deposited layers or beads of the weld metal; and FIG. 4 is a sectional view showing an example of a welding groove formed in the material to be welded.

Referring to FIG. 1, a pair of plates 1 and 2 of nickel containing steel such as 3.5% nickel steel are placed at end-to-end relationship with a substantially U-shaped groove 3 formed at the abutting portion. A submerged arc welding is performed under the aforementioned welding conditions using the aforementioned flux and the aforementioned welding metal to form a plurality of deposited layers 4 which are positioned in superimposed staggered relationship. According to the present invention, the thickness T of each deposited layer 4 is less than 7 mm and in the illustrated staggered arrangement the offset or transverse distance S between two succeeding layers is less than 5 mm. The term "transverse distance" herein used means a distance between the centers or highest portions of two superimposed layers as measured in the direction perpendicular to the thickwise direction of the layer and perpendicular to the welding line shown by a phantom line C.

Referring specifically to the layer 4a shown in FIG. 1, it receives a thermal effect at the area designated by the numeral 5 when an adjacent layer 4b is formed so that recrystallization proceeds in the area 5 to produce a fine crystalline structure. Further, when another adjacent layer 4C is deposited the metal in the layer 4a receives a thermal effect at the area designated by the numeral 6 so that a fine crystalline structure is produced in the area 6. Since the layer 4 is relatively thin, the layer is substantially occupied by the recrystallized fine structure and the thermally unaffected layer is 2 mm thick or less. Thus, it is possible to produce a weld structure having a high impact resistance at extremely low temperatures. FIG. 2 shows the deposited layers 4 of the weld metal in detail. In the drawing, the numeral 7 shows the area where the metal has received a thermal effect and recrystallization has proceeded.

Referring now to FIG. 3, there are shown several examples of deposited layer arrangements. More specifically, FIG. 3A shows an example wherein layers 4 of the weld metal are deposited one on another without any transverse offset, while FIG. 3B shows an example of staggered arrangement. It will be noted that the latter arrangement is more preferable in respect of recrystallization. In FIG. 3C, it will be noted that a transverse distance S between the highest portion of a layer and that of a succeeding superimposed layer has also an influence on the area of thermally unaffected portion 8. Thus, the inventors propose to maintain the distance below 5 mm.

EXAMPLES

Welding operations were performed on 3.5% Ni steel meeting the specification of ASTM A-203 and having the dimension as shown in FIG. 4. In performing the welding processes, flux materials have been prepared as shown in Table I.

Table I

|   | CaO | MgO | SiO$_2$ | Al$_2$O$_3$ | CaF$_2$ | Basicity |
|---|---|---|---|---|---|---|
| A | 20 | 29 | 38 | 10 | 3 | 1.3 |
| B | 20 | 25 | 25 | 20 | 10 | 1.8 |
| C | 16 | 26 | 21 | 20 | 17 | 2.0 |
| D | 16 | 37 | 21 | 14 | 12 | 2.5 |

Note:
The basicity is defined by the formula $B = \dfrac{CaO + MgO}{SiO_2}$ (in weight %)

Further, the welding electrode contained on the basis of weight 10 percent of CaF$_2$, 2.7 percent of Ni, 0.5 percent of Mo and the balance of Fe a mild steel. The mild steel had a composition of by weight, 0.05 percent of carbon, 0.50 percent of manganese and the balance of iron. The welding operations were performed as shown in the Table II and the welded specimens were formed with U-shaped notches of 2 mm width at the welded portions and subjected to Charpy impact tests at a temperature of minus 101° C. The results are also shown in Table II.

Table II

|  | Specimen | Flux | Welding Condition | | | Deposited Layers | | Thermally Unaffected Layer | Test Results | |
|---|---|---|---|---|---|---|---|---|---|---|
|  |  |  | Current (A) | Voltage (V) | Thermal Input (J/cm) | Transverse Distance (mm) | Thickness of Layer (mm) |  | Oxygen Content in Welding Metal (ppm) | Impact Resistance (kg · m) |
| Prior Art | 1 | D | 450 | 28 | 25000 | 2.3 | 10–11 | 2.2 | 260 | 2.1 |
|  | 2 | D | 600 | 30 | 30000 | 6.5 | 8–9 | 3.4 | 245 | 0.5 |
|  | 3 | D | 800 | 445 | 45000 | 0.8 | 9–10 | 2.5 | 250 | 1.8 |
|  | 4 | D | 800 | 445 | 45000 | 1.2 | 9–10 | 2.7 | 230 | 0.9 |
|  | 5 | A | 500 | 42 | 25000 | 3.2 | 5–6 | 1.2 | 450 | 1.3 |
| Invention | 6 | D | 420 | 38 | 25000 | 2.5 | 3–4 | 0.7 | 280 | 9.2 |
|  | 7 | D | 450 | 40 | 30000 | 1.5 | 4–5 | 0.8 | 230 | 12.6 |
|  | 8 | C | 500 | 42 | 30000 | 1.7 | 4–5 | 1.0 | 2500 | 8.3 |
|  | 9 | D | 550 | 45 | 35000 | 1.5 | 5–6 | 1.2 | 250 | 9.5 |
|  | 10 | D | 600 | 45 | 35000 | 3.2 | 5–6 | 1.5 | 275 | 6.9 |
|  | 11 | B | 650 | 45 | 37000 | 4.5 | 6–7 | 1.7 | 260 | 7.8 |
|  | 12 | D | 420 | 38 | 25000 | 0.9 | 3–4 | 0.7 | 245 | 10.4 |
|  | 13 | D | 4500 | 42 | 25000 | 1.2 | 4–5 | 0.8 | 240 | 11.5 |

In the above tests, it was found that the specimens 1 and 2 had relatively thick beads of cross-section having relatively small radius of curvature at the surface of each layer. This is caused by an insufficient arc voltage. Thus, there was a relatively large area of thermally unaffected metal. As the results, they showed very poor impact resistance. In the specimen 2, it will be seen that the relatively large transverse distance S had an adverse effect on the impact resistance.

In the specimens 3 and 4, it will be seen that excessive welding current and thermal input have produced deposited layers of excessive thickness. Therefore, it has not been possible to produce an adequate coverage of recrystallized fine structures. This tendency is particularly significant in the specimen 4 because, in this specimen, the welding metal has been deposited without transverse offset between two adjacent layers.

The specimen 5 was welded using the flux of lower basicity. Therefore, there was an excessive amount of residual oxygen in the welded metal. The specimens 6 through 13 which have been welded in accordance with the present invention had thermally unaffected areas of less than 2 mm thick. Thus, these specimens had a satisfactory impact resistance.

We claim:

1. A submerged arc welding process employing a flux having a basicity as defined by a formula CaO+MgO/SiO$_2$ in weight percentage of between about 1.5 and 3 and comprising the step of depositing a plurality of layers of weld metal under a welding current of from about 400 to 700 A and an arc voltage of from about 35 to 48 V, each of said layers having a thickness not greater than about 7 mm, so that the weld metal in an underlying layer is thermally affected by deposition of an adjacent overlying layer, and whereby recrystallization is effected in a substantial thickness of the underlying layer and the thermally unaffected portion of said underlying layer is less than about 2 mm thick.

2. A submerged arc welding process in accordance with claim 1 in which said deposited layers of weld metal are arranged in staggered relationship.

3. A submerged arc welding process in accordance with claim 2 in which said layers are arranged with a transverse distance between the highest portion of one layer and that of an adjacent superimposed layer is less than 5 mm.

4. A submerged arc welding process in accordance with claim 1 which is applied to welding nickel containing steel, said process using a bond-type flux containing on the basis of weight 10 to 30 percent of SiO$_2$, 8 to 20 percent of Al$_2$O$_3$, 25 to 45 percent of MgO, 10 to 30 percent of CaO, 7 to 20 percent of CaF$_2$ and at least one selected from the group consisting of metallic Si, Fe—Si, Fe—Si—Mn in an amount 0 to 0.6 percent calculated in term of metallic Si.

5. A submerged arc welding process in accordance with claim 1 in which use is made of a welding electrode of cored wire consisting of a mild steel and core material, the core material including, on the basis of weight to the total weight of the welding electrode, 5 to 25 percent of CaF$_2$, 2.5 to 5.5 percent of nickel, 0 to 0.5 percent of Mo, 0 to 0.5 percent of Ti.

6. A submerged arc welding process in accordance with claim 1 in which thermal input is maintained below 40,000 J/cm.

* * * * *